(12) United States Patent
Kabeya

(10) Patent No.: US 8,054,513 B2
(45) Date of Patent: Nov. 8, 2011

(54) IMAGE DISPLAYING METHOD, IMAGE DISPLAY APPARATUS AND FACSIMILE APPARATUS FOR DISPLAYING EFFECTIVE DATA ON DISPLAY SCREEN

(75) Inventor: Shozo Kabeya, Gamagori (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1001 days.

(21) Appl. No.: 11/489,626

(22) Filed: Jul. 20, 2006

(65) Prior Publication Data

US 2007/0019246 A1    Jan. 25, 2007

(30) Foreign Application Priority Data

Jul. 20, 2005 (JP) ................. 2005-209357

(51) Int. Cl.
 *H04N 1/04* (2006.01)
 *H04N 1/00* (2006.01)
(52) U.S. Cl. ...................... 358/474; 358/400
(58) Field of Classification Search ........... 358/400, 358/443, 448, 449, 451, 453, 474; 382/276, 382/286, 293, 295, 298
See application file for complete search history.

(56) References Cited

U.S. PATENT DOCUMENTS

| | | | | |
|---|---|---|---|---|
| 5,428,721 A * | 6/1995 | Sato et al. | ...... | 345/650 |
| 5,430,832 A * | 7/1995 | Imaizumi et al. | ...... | 345/620 |
| 5,901,253 A * | 5/1999 | Tretter | ...... | 382/289 |
| 5,990,860 A * | 11/1999 | Takeuchi | ...... | 345/667 |
| 6,011,634 A * | 1/2000 | Aihara et al. | ...... | 358/468 |
| 6,154,286 A * | 11/2000 | Konno et al. | ...... | 358/1.13 |
| 7,215,345 B1 * | 5/2007 | Hanko | ...... | 345/620 |
| 7,286,253 B2 * | 10/2007 | Inoue et al. | ...... | 358/1.15 |
| 2002/0114535 A1* | 8/2002 | Luo | ...... | 382/282 |
| 2002/0191031 A1* | 12/2002 | Ricard | ...... | 345/838 |
| 2003/0023594 A1* | 1/2003 | Ramamurthi | ...... | 707/7 |
| 2004/0107403 A1* | 6/2004 | Tetzchner | ...... | 715/513 |
| 2004/0179234 A1* | 9/2004 | Yoshitani | ...... | 358/1.15 |
| 2005/0041584 A1* | 2/2005 | Lau et al. | ...... | 370/235 |
| 2005/0190391 A1* | 9/2005 | Yoneoka | ...... | 358/1.9 |
| 2006/0114327 A1* | 6/2006 | Araya et al. | ...... | 348/207.99 |
| 2006/0115922 A1* | 6/2006 | Araya et al. | ...... | 438/61 |
| 2007/0081638 A1* | 4/2007 | Taneya et al. | ...... | 379/88.11 |
| 2007/0097219 A1* | 5/2007 | Nomura et al. | ...... | 348/208.7 |

FOREIGN PATENT DOCUMENTS

JP        5-327962        12/1993

OTHER PUBLICATIONS

Stanley, The Complete Idiot's Guide to Adobe Photoshop 6, 2001, Penguin Group Inc, pp. 136-137.*

* cited by examiner

*Primary Examiner* — Gabriel Garcia
(74) *Attorney, Agent, or Firm* — Banner & Witcoff, Ltd.

(57) ABSTRACT

An image is displayed on a rectangular display screen of the display unit by the steps of obtaining minimum or maximum positions of black dot in the width direction and longitudinal direction in an image data stored in an image memory; deciding a position of one corner portion of a rectangular effective image data area in the image data from the minimum or maximum positions in the width and longitudinal directions; and controlling the display unit to display the rectangular effective image data area based on the position of the decided one corner portion in the image data on the display screen of the display unit starting from the one corner portion.

24 Claims, 9 Drawing Sheets

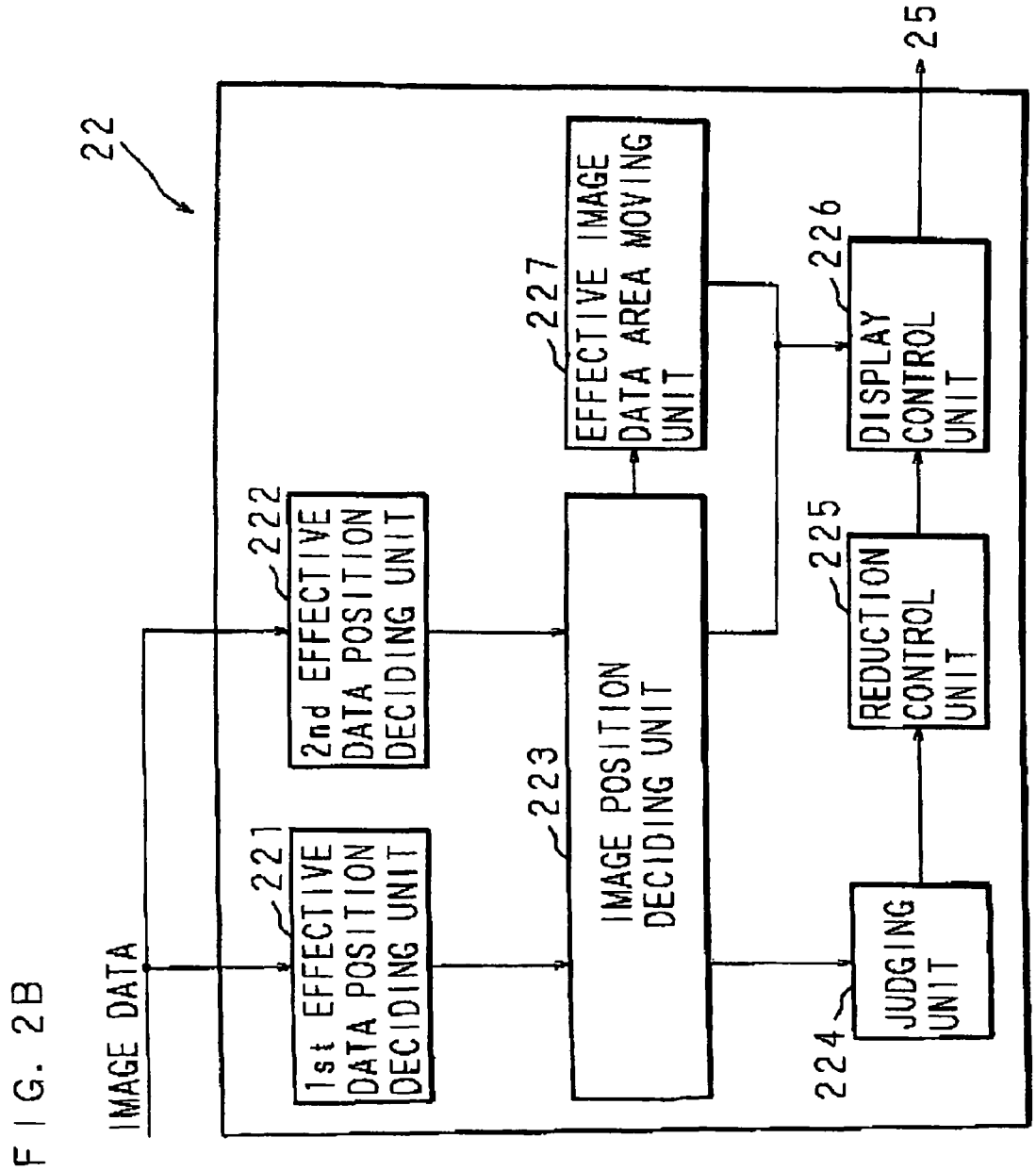

US 8,054,513 B2

IMAGE DISPLAYING METHOD, IMAGE DISPLAY APPARATUS AND FACSIMILE APPARATUS FOR DISPLAYING EFFECTIVE DATA ON DISPLAY SCREEN

CROSS-REFERENCE TO RELATED APPLICATIONS

This Nonprovisional application claims priority under 35 U.S.C. §119(a) on Patent Application No. 2005-209357 filed in Japan on Jul. 20, 2005, the entire contents of which are hereby incorporated by reference.

BACKGROUND OF THE INVENTION

1. Field of the Invention

The present invention relates to an image displaying method and an image display apparatus, and to a facsimile apparatus which has a function to display received facsimile image data.

2. Description of Related Art

Conventionally, suggested as an image display apparatus and a facsimile apparatus of this kind is, for example, a terminal device with a facsimile function which is described in Japanese Patent Application Laid-Open No. 05-327962 (1993). In this terminal device with a facsimile function, received facsimile data of a prejudged amount from the top thereof is displayed at a display unit as source information.

At the above terminal device with a facsimile function, however, only data of a prejudged amount from the top of received facsimile data is displayed at the display unit as described above, since the screen of the display unit is small. Consequently, the screen gets into a blank state in which nothing is displayed when data of a prejudged amount from the top is null data (blank).

For this reason, an operator of the above terminal device with a facsimile function might be misled into thinking that receiving has failed even though facsimile data has been received.

BRIEF SUMMARY OF THE INVENTION

The present invention has been made with the aim of solving the above problem, and it is an object thereof to provide an image displaying method and an image display apparatus which can reliably display an area including effective data, in particular a black dot, without displaying null data.

Another object of the present invention is to provide a facsimile apparatus which can reliably prevent the operator thereof from being misled into thinking that receiving has failed even though facsimile data has been received.

In order to achieve the above aim, an image displaying method according to the present invention is an image displaying method for displaying an image stored in an image memory to a rectangular display screen provided on a display unit, and is characterized by comprising the steps of obtaining a minimum or maximum effective data position in a first scanning direction in the image data stored in the image memory; obtaining a minimum or maximum effective data position in a second scanning direction in the image data stored in the image memory; deciding a position of one corner portion of a rectangular effective image data area in the image data stored in the image memory from the minimum or maximum effective data positions in the first scanning direction and the second scanning direction; and controlling the display unit to display the rectangular effective image data area based on the position of the decided one corner portion in the image data stored in the image memory on the display screen of the display unit starting from the one corner portion.

Also an image display apparatus according to the present invention is characterized by comprising: a display unit that has a rectangular display screen; a storage unit that stores image data to be displayed on the display screen of the display unit; a first effective data position deciding unit that obtains a minimum or maximum effective data position in a first scanning direction in the image data stored in the storage unit; a second effective data position deciding unit that obtains a minimum or maximum effective data position in a second scanning direction in the image data stored in the storage unit; an image position deciding unit that decides a position of one corner portion of a rectangular effective image data area in the image data stored in the storage unit from the positions obtained by the first and second effective data position deciding units; and a display control unit that controls the display unit to display the rectangular effective image data area based on the position of the one corner portion decided by the image position deciding unit in the image data stored in the storage unit on the display screen of the display unit starting from the one corner portion.

Further more, a facsimile apparatus according to the present invention is characterized by above mentioned image display apparatus.

The above and further objects and features of the invention will more fully be apparent from the following detailed description with accompanying drawings.

BRIEF DESCRIPTION OF THE SEVERAL VIEWS OF THE DRAWINGS

FIG. 2B is a functional block diagram schematically showing functions executed by a CPU thereof;

DETAILED DESCRIPTION OF THE PRESENT INVENTION

Figure 1:
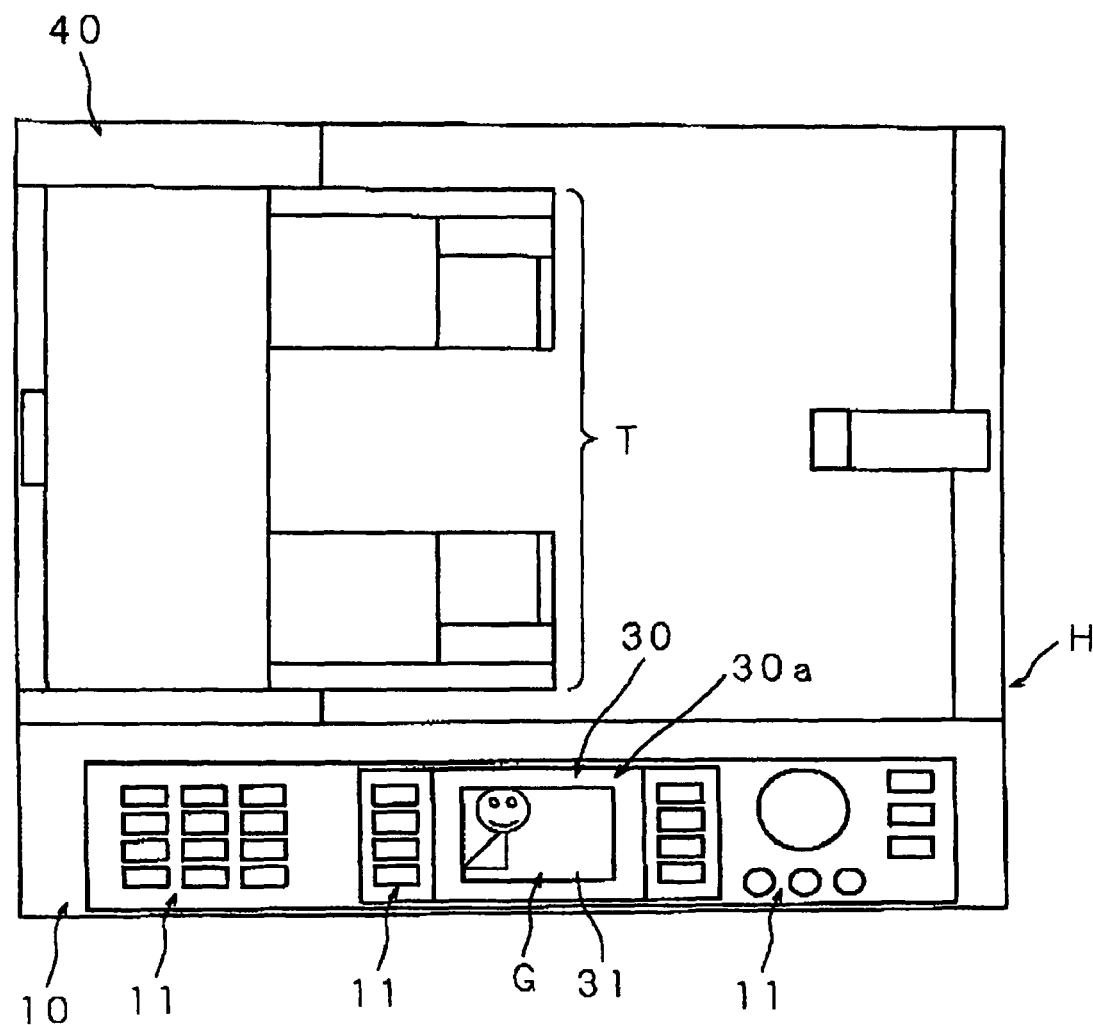
FIG. 1 is a plan view of a facsimile apparatus according to the present invention configured with one embodiment of an image display apparatus according to the present invention.

The following description will explain one embodiment of an image display apparatus according to the present invention with reference to the drawings. FIG. 1 is a plan view of a facsimile apparatus according to the present invention in which one embodiment of an image display apparatus according to the present invention is built in.

The entire facsimile apparatus in which an image display apparatus according to the present invention is built in is covered with a housing H. An operation panel 10 is provided at a front portion of the top surface of the housing H. It should be noted that the "front portion" means a portion of the facsimile apparatus where an operator generally faces while he/she operates the facsimile apparatus. Besides, a reading unit 40 for reading an image to be transmitted from the facsimile apparatus and a tray T for conveying originals to be read to the reading unit 40 are provided at the top surface of the housing H and behind the operation panel 10.

The operation panel 10 has a display unit 30 at a center portion in the longitudinal direction thereof and a plurality of push-button type control switches 11 at both sides in the longitudinal direction thereof.

The display unit 30 comprises a VRAM (not illustrated) for storing image data (data including an image G which will be described later) to be displayed on a display screen 31, a drive circuit (not illustrated) for making the image data, which is stored in the VRAM, display on the display screen 31 and a liquid crystal panel 30a (display unit) provided with the display screen 31. The drive circuit makes the image data, which is stored in the VRAM, display on the display screen 31 of the liquid crystal panel 30a.

Figure 2A:
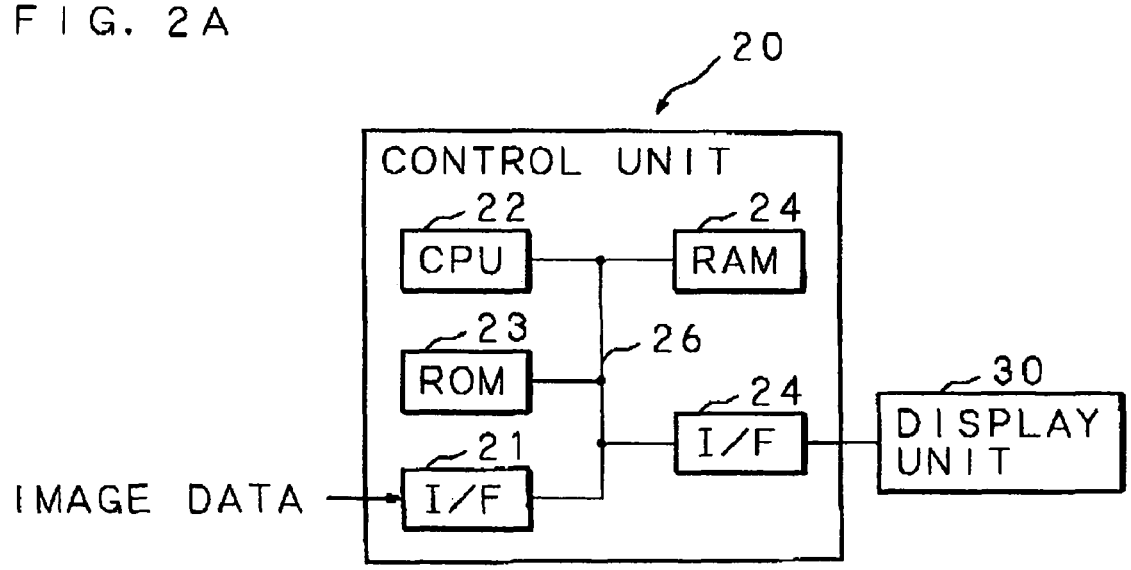
FIG. 2A is a circuit block diagram of a control system of a facsimile apparatus according to the present invention configured with one embodiment of an image display apparatus according to the present invention.

Furthermore, as shown in FIG. 2A of a circuit block diagram of a control system of the facsimile apparatus, the facsimile apparatus has a control unit 20, which is in charge of control of the entire facsimile apparatus, inside the housing H.

The control unit 20 is provided with a ROM 23 which stores a program for controlling the facsimile apparatus, a CPU 22 for controlling the facsimile apparatus by executing the program stored in the ROM 23, a RAM 24 which functions as an image memory (storage unit) and stores various data to be generated in the process of control of the CPU 22 and also functions as a VRAM for storing image data, an interface (which will be hereinafter written as I/F) 21 for inputting image data and an I/F 25 for transmitting a signal to the display unit 30. It should be noted that the ROM 23, the CPU 22, the RAM 24, the I/F 21 and the I/F 25 described above are electrically connected to each other via a bus 26.

In the RAM 24, image data of bitmap format is stored. Usually, because image data received by a facsimile communication is not bitmap format, the image data received by a facsimile communication is inputted from the I/F 21 and stored in the RAM 24 after converted into the bitmap format.

FIG. 2B is a functional block diagram schematically showing functions executed by the CPU 22. Concretely, a first effective data position deciding unit 211 which obtains a minimum (or maximum) effective data position in a main scanning direction (first scanning direction), a second effective data position deciding unit 212 which obtains a minimum (or maximum) effective data position in a sub scanning direction (second scanning direction), an image position deciding unit 223 which decides a position of one corner portion of a rectangular effective image data area in the image data from the positions obtained by the first and second effective data position deciding units 211 and 222, and a display control unit 226 which causes the image display unit 30 to display the rectangular effective image data area decided by the image position deciding unit 223 on the display screen 31 of the display unit 30 are included as the functional blocks.

Further, a judging unit 224 which judges whether a size of the display data is larger than a size of the display screen 31 of the display unit 30 or not, and a reduction control unit 225 which causes the display unit 30 to display an image in a reduced manner so that a size of the display data is matched with a size of the display screen 31 of the display unit 30 when the judging unit 224 judges that a size of the display data is larger than a size of the display screen 31 of the display unit 30 are also included as the functional blocks.

Furthermore, an effective image data area moving unit 227 which moves the effective image data area in the image data if necessary is included ad the functional block.

Here, the following description will explain the operation of the facsimile apparatus. The facsimile apparatus is provided with functions such as a reading function to read an image recorded on an original to be read for transmitting data to the outside, a recording function to record data received from the outside by printing it on a paper and a display function to display data received from the outside on the display screen 31 of the display unit 30.

When the above reading function is operated, the operator first inserts an original to be read to the left in FIG. 1 from the lower side of the tray T and then operates the push-button type control switches 11 to select the reading function. This causes the facsimile apparatus to start to read the original to be read with the reading unit 40 while conveying the original to be read. When the reading unit 40 finishes reading the original, the original is taken out to the right in FIG. 1 to the upper side of the tray T.

On the other hand, when the above recording function is operated, the facsimile apparatus first stores image data in the RAM 24 via the I/F 21. A recording unit (for example, an electrographic printer), which is located inside the housing H and is not illustrated, records (prints) the image data, which is stored in the RAM 24, on a paper as an actual image. T The paper on which the image data is recorded (printed) thereon as the actual image is taken out toward the front portion from a paper outlet (not illustrated) formed below the operation panel 10.

The above recording function may be operated automatically when the facsimile apparatus receives image data. However, there are various advantages as described later when the facsimile apparatus is configured in such a manner that the recording function is operated when the operator operates the push-button type control switches 11 after he/she checks an image displayed by the display function such as an image display apparatus according to the present invention.

Figure 3:
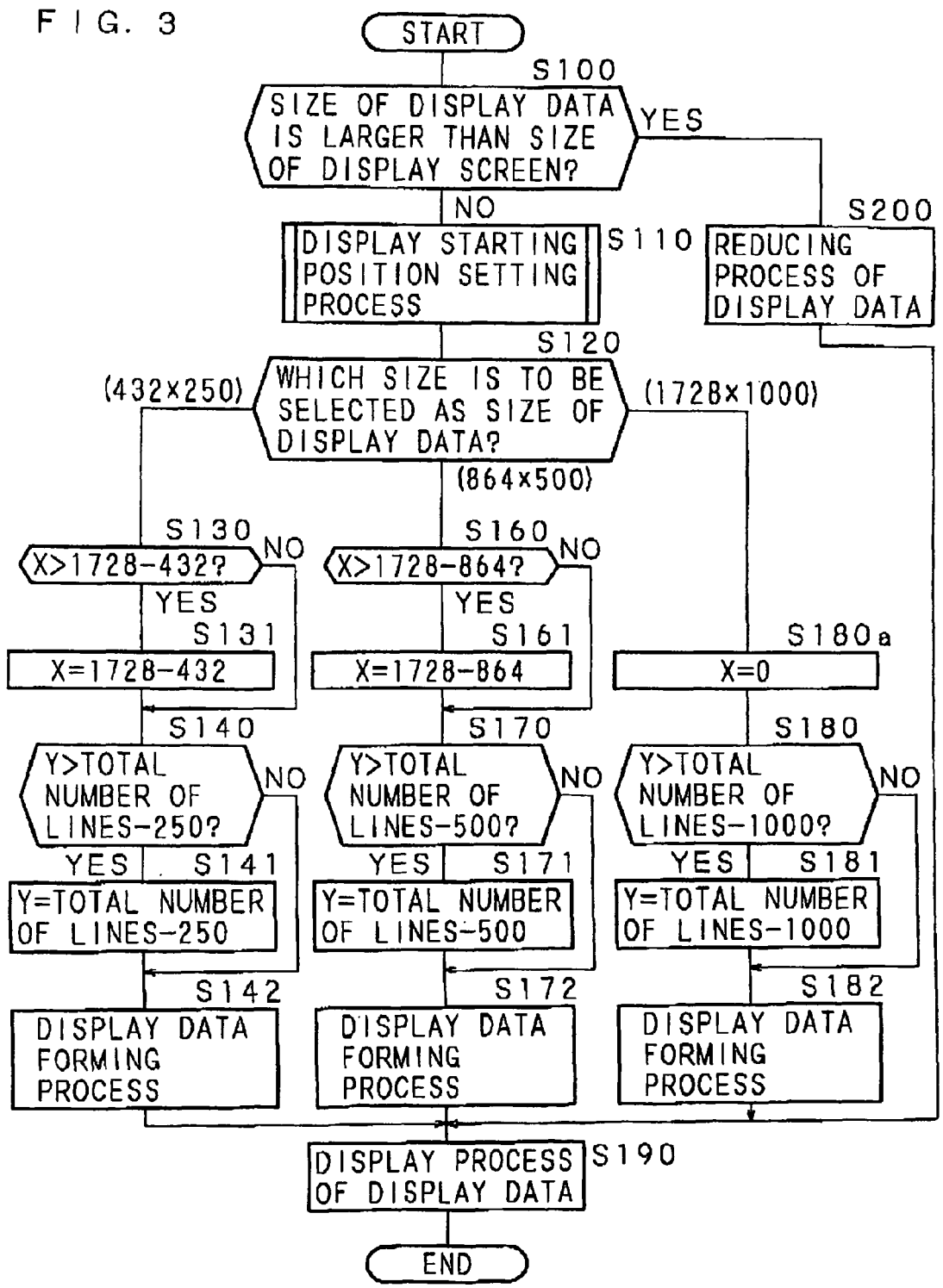
FIG. 3 is a flow chart showing a main routine of the process procedure of a facsimile apparatus according to the present invention configured with one embodiment of an image display apparatus according to the present invention.
Figure 4:
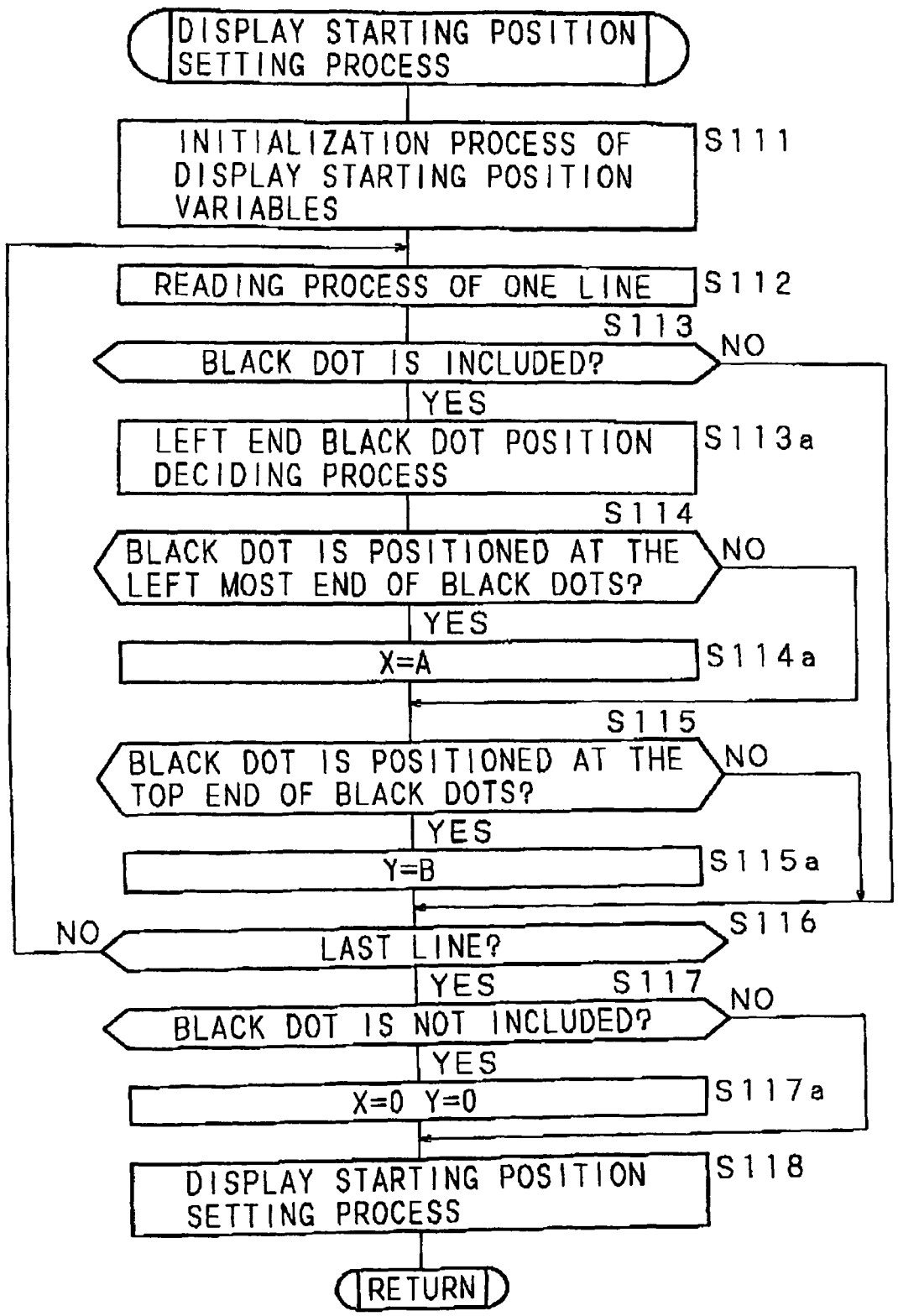
FIG. 4 is a flow chart showing the process procedure of a case where the process procedure of a portion of the main routine of FIG. 3 is programmed with a subroutine.
Figure 8:
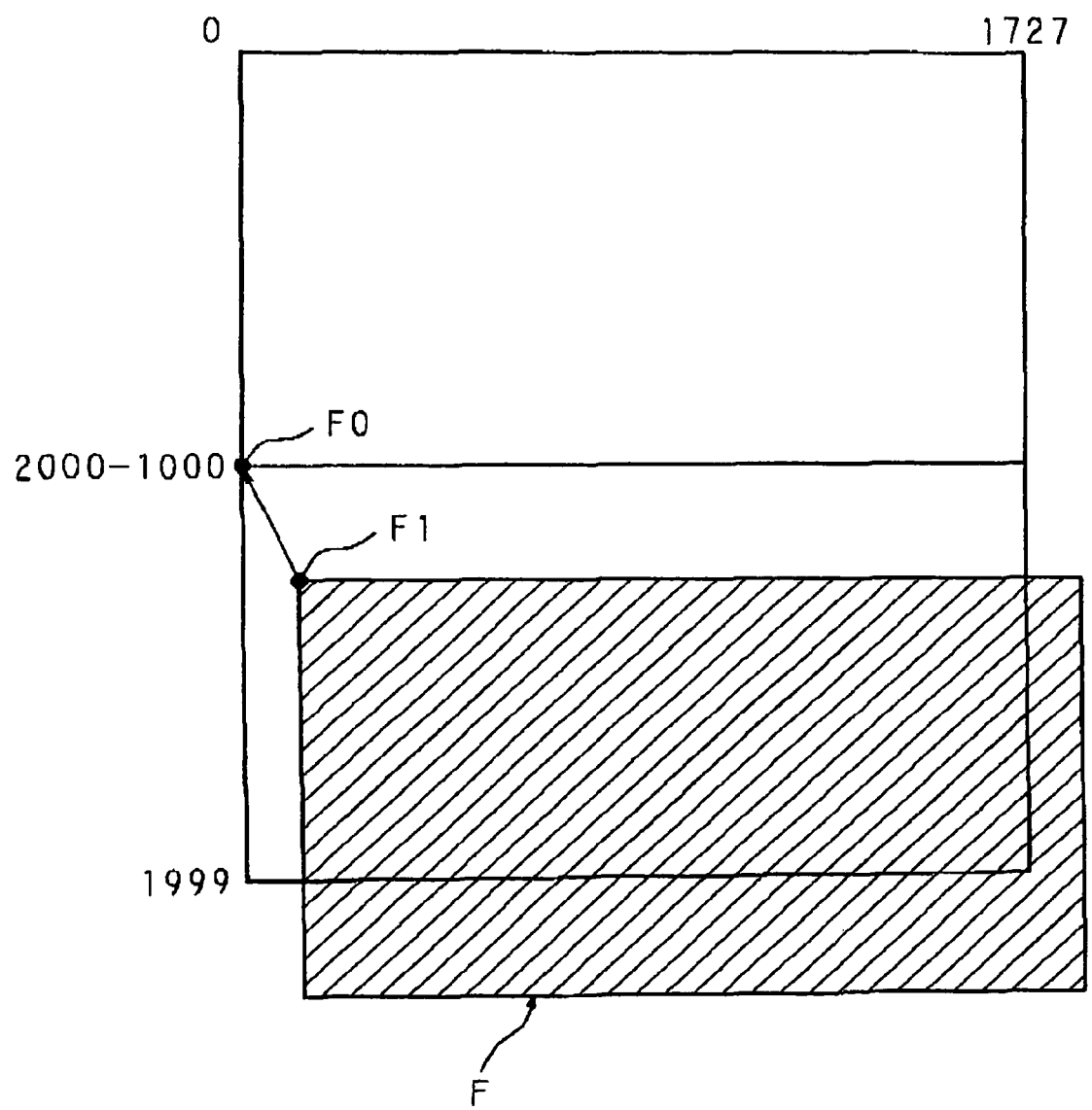

The following description will explain the process procedure of one embodiment of the image display apparatus according to the present invention and the various advantages, with reference to flow charts of FIG. 8 and FIG. 4. It should be noted that FIG. 3 shows a flow chart of a main routine of the process procedure of one embodiment of the image display apparatus according to the present invention and FIG. 4 shows a flow chart of a subroutine which is a portion thereof. The following process procedure shown in the flow charts of FIG. 3 and FIG. 4 is realized when the CPU 22 executes a program stored in the ROM 23.

In the following explanation, it should be assumed that the image data is image data for displaying an image G in a state shown in the schematic view of FIG. 5. In particular, the image data is data for displaying the image G at a vertical middle portion (see FIG. 5) of a portion close to the right side of the entire image data and is stored in an storage area of the RAM 24.

Figure 5:
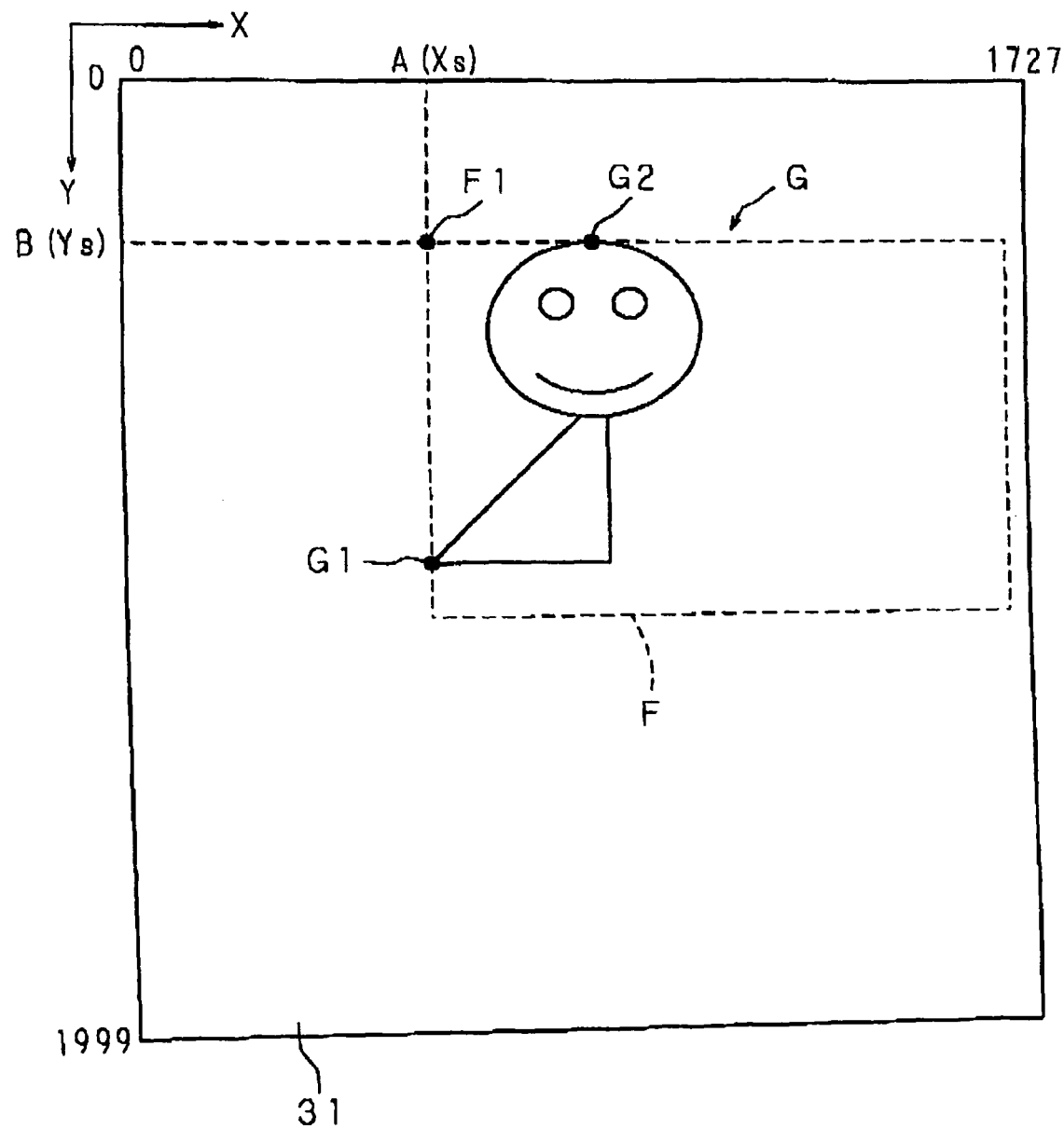
FIG. 5 is a schematic illustration for illustrating the positional relationship of images on the display screen in one embodiment of an image display apparatus according to the present invention.

Note that the image data is configured by a pixel matrix in which pixels arranged in the X direction (width direction, that is, a first scanning direction) and pixels arranged in the Y direction (height direction, that is, a second scanning direction) on a rectangular coordinate plane set to the image data shown in FIG. 5. When the image data is stored in or read from the RAM 24, it is stored in or read out one by one line of the first scanning direction from the uppermost line in the second scanning direction.

With the initiation of execution of the program stored in the ROM 23, at step S100, the CPU 22 judges whether the size of the display data, which is represented as the number of dots, is larger than the size of the display screen 31 of the liquid crystal panel 30a, which is represented as the number of pixels, or not. In particular, when a size smaller than the size of the display screen 31 of the liquid crystal panel 30a is selected as the size of the display data, the judgment result at step S100 becomes NO.

In this case, the CPU 22 advances the process to a display starting position setting process at step S110. The concrete procedure of the display starting position setting process at step S110 is shown in the flow chart of the subroutine of FIG. 4.

At step S111, the CPU 22 executes an initialization process of display starting position variables. In this initialization process, a display starting position variable X is initialized to an initial position Xo=FFFFFFFFH ("H" at the tale indicates that this is a hexadecimal number) and a display starting position variable Y is initialized to an initial position Yo=FFFFFFFFH. It should be noted that the display starting position variables X and Y represent the X coordinate and the Y coordinate on the rectangular coordinate plane set to the image data.

After the initialization process of the display starting position variables X and Y is executed as described above, the CPU 22 executes the process from step S112 to step S116 repeatedly. First, at step S112, a reading process of one line of the image data stored in the RAM 24 is executed. In particular, the CPU 22 reads out one line of the image data (at first, the top end line of the image data) from the RAM 24 at step S112. Next, at step S113, the CPU 22 judges whether a black dot (effective data) is included in data of the one line read out from the RAM 24 in the process at step S112 or not.

When no black dot is included in the one line of the image data, the judgment result at step S113 becomes NO. In this case, the CPU 22 advances the process to step S116 and judges whether the one line of the image data, which has been read out from the RAM 24 at step S112, is the last line or not.

When it is judged as NO at step S116, the CPU 22 returns the process to step S112 and reads out the next one line of the image data from the RAM 24.

In the meantime, it is judged as YES at step S113 when a black dot is included in the one line of the image data read out from the RAM 24. In this case, the CPU 22 executes a left end black dot position deciding process in next step S113a. In particular, the CPU 22 decides the position of the leftmost end of the black dot included in the one line of the image data read out from the RAM 24 is as, for example, A.

Next, at step S114, the CPU 22 judges whether the position of the black dot specified by A described above is the leftmost end of black dots included in the respective lines of the image data which have ever been read out from the RAM 24. For example, judged is whether X=Xo>A is satisfied or not when X=Xo=FFFFFFFFH, i.e. an initial value, is maintained at this time. Here, when X=Xo>A is satisfied, the judgment result at step S114 becomes YES.

When X=Xo>A is satisfied as described above, it means that the black dot at the left end of the one line of the image data read out at step S112 is positioned on the left side of the initial value Xo=FFFFFFFFH this time.

In this case, in next step S114a, the CPU 22 newly sets X=A. As a result, the display starting position variable X represents not Xo but the position of the black dot at the left end included in the one line of the image data which is read out newly from the RAM 24 this time at step S112.

After execution of the process at step S114a, at step S115, the CPU 22 judges whether the black dot whose position is specified as X=A described above is positioned at the top end of black dots which have ever been detected or not. For example, judged is whether Y=Yo>B is satisfied or not when Y=Yo=FFFFFFFFH, i.e. an initial value, is maintained at this time. Here, when Y=Yo>B is satisfied, the judgment result at step S115 becomes YES.

When Y=Yo>B is satisfied as described above, it means that the black dot at the left end of the one line of the image data read out at step S112 is positioned above the initial value Yo=FFFFFFFFH this time.

In this case, in next step S115a, the CPU 22 newly sets Y=B. As a result, the display starting position variable Y represents not Yo but the position of the one line of the image data which is read out newly from the RAM 24 this time at step S112.

When the process at step S115a finishes as described above, the CPU 22 advances the process to step S116 and judges whether the one line of the image data, which has been read out from the RAM 24 at step S112, is the last line or not. When the one line of the image data which has been read out at step S112 is not the last line as a result, the judgment result at step S116 becomes NO.

Subsequently, as before, the CPU 22 executes the process from step S112 to step S116 repeatedly. When it is judged as YES at step S116, the CPU 22 advances the process to next step S117. At step S117, the CPU 22 judges whether a black dot is included in the image data or not. Consequently, when the process is advanced to step S117, it means that all the lines of the image data has been read out from the RAM 24. In addition, the judgment result that no black dot is included means that the image data read out from the RAM 24 is in a completely blank state.

Here, when all the judgment result at step S113 is NO about all lines and it is judged as YES at step S116 in the process of the above program, it means that there is no black dot, Consequently, the judgment result at step S117 becomes YES. For this reason, X=0 and Y=0 are set in next step S117a.

Concretely, when the image data is in a completely blank state, positions of X=0 and Y=0 of the image data, that is, the left and top corner portion is made to be the display start position. In this case, an image is displayed on the display screen 31 is not a black dot but display data, bringing about an effect of effective display of the display data.

On the other hand, when it is judged as YES once or more at step 8113 and it is judged as YES at step S116, it means that a black dot is included in the image data. Consequently, the judgment result at step S117 becomes NO.

In this way, the display starting position which will be described later is decided at step S118 after the process at step S117a finishes or after it is judged as NO at step S117. As is clear from the above description, X=A and Y=B described above are specified respectively as the leftmost end position (a minimum effective data position in a first scanning direction) and the top end position (a minimum effective data position in a second scanning direction) of the image G. That is, it is judged that the point of intersection F1 of the line in the height direction (second scanning direction) which runs through X=A and the line in the width direction (first scanning direction) which runs through Y=B on the rectangular coordinate plane of the image data shown in FIG. 5 is the left and top end position (left and top corner portion) of the image G represented by the image data. It should be noted that this point of intersection F1 is represented by (X, Y)=(Xs, Ys).

In particular, on the rectangular coordinate plane of the image data shown in FIG. 5, X=A represents the position G1 of the leftmost end effective pixel of the image G. In addition, Y=B represents the position G2 of the top end effective pixel of the image G. Consequently, the coordinate value of the point of intersection F1 of the line in the height direction which runs through X=A and the line in the width direction which runs through Y=B is (X, Y)=(Xs, Ys) and specifies the left and top end of the effective image data area F included in the image data, i.e. the rectangular effective image data area F surrounding the image G. It should be noted that the point of intersection F1 corresponds to a point at the left and top corner portion in the rectangular effective image data area F surrounding the image G as shown in FIG. 5.

It should be noted that the judgment result at step S114 becomes NO when a black dot, which is positioned at the leftmost side, included in each one line of the image data sequentially read out from the RAM 24 is not positioned on the left side of black dots, which are positioned at the leftmost side, included in the respective lines of the image data read out from the RAM 24 before in the process from step S112 to step S116. In this case, the previous X value is maintained. Likewise, the judgment result at step S116 becomes NO when a black dot, which is positioned at the leftmost side, included in each one line of the image data sequentially read out from the RAM 24 is not positioned above black dots, which are positioned at the leftmost side, included in the respective lines of the image data read out from the RAM 24 before. In this case, the previous Y value is maintained.

It should be noted that the process of the subroutine of the display starting position setting process at step S110 (process of the flow chart shown in FIG. 4) corresponds to functional blocks of the first effective data position deciding unit 221, the second effective data position deciding unit 212, and the image position deciding unit 223. Further, X=A, Y=B, X=Xs and Y=Ys to be set in this process correspond to the position of one corner portion of a rectangular effective image data area in the present embodiment.

When the display starting position setting process at step S110 fishes as described above, the CPU 22 returns the process to step S120 of the main routine shown in FIG. 3. At step S120, judged is which size is to be selected as the size of the display data. It should be noted that the standard size of the display data is "width"×"height"="1728 dots"×"2000 lines" which is an original size of the image data. Here, 1728 dots in the width direction means that one line has the 0th dot through the 1727th dot from the left end to the right end (in the first scanning direction). In addition, 2000 lines in the height direction means that there are the 0th line through the 1999th line from the top end to the bottom end (in the second scanning direction).

Furthermore, it should be assumed that size of the display screen 31 of the liquid crystal panel 30a is "width"×"height"="1728 dots"×"1000 dots".

In addition, in the following description, the display size selected at step S120 becomes the size of the effective image data area.

When a size of "width"×"height"="432 dots"×"250" lines is selected as the size of the display data, in other words, the size of the effective image data area, the CPU 22 advances the process from step S120 to step S130.

At step S130, the CPU 22 judges whether X>1728−432 is satisfied or not. In particular, since X=Xs, judged is whether X=Xs>1728−432 is satisfied or not.

Here, when X=Xs>1728−432 is satisfied, the judgment result at step 8130 becomes YES. This means that X=Xs is positioned on the right side of the 432nd dot from the right end of one line. In this case, consequently, the CPU 22 sets X=1296(=1728−432) at step S131.

As a result of the process in this step S131, the X coordinate of the point F1 at the left and top corner portion in the rectangular effective image data area F surrounding the image G moves leftward to the coordinate value 1296 (=1728−432) on the image data indicated by F0. If such a process is not executed, as will be described later in detail, an image is displayed at a portion close to the left end of the display screen 31 of the liquid crystal panel 30a and display data does not exist at the right side of the display screen 31 (displayed is a portion deviated to the right outside of the image data stored in the RAM 24 in which image data does not exist) when an image to be displayed is positioned at a portion close to the right end of the entire image data. On the other hand, when the above process is executed, an image is displayed on a portion close to the left end of the display screen 31 and displayed at the right side of the display screen 31 is not a black dot but display data, bringing about an effect of effective display of the display data.

On the other hand, when X=Xs>1728−432 is not satisfied, it is judged as NO at step S130. This means that X=Xs is positioned at the 432nd dot from the right end of one line or on the left side thereof. In this case, consequently, the CPU 22 keeps the setting of X at step S118, i.e., maintains X=Xs.

Next, at step S140, the CPU 22 judges whether Y>"total number of lines"−250 is satisfied or not, In particular, since Y=Ys, judged is whether Y=Ys>"total number of lines"−250 is satisfied or not. It should be noted that the total number of lines corresponds to the total number of lines 2000 of the image data read out from the RAM 24.

Here, when Y=Ys>"total number of lines"−250 is satisfied, the judgment result at step S140 becomes YES. This means that Y=Ys is positioned below the 250th line from the bottom end of all the lines of the image data. In this case, consequently, the CPU 22 sets Y=1750 (="total number of lines"−250) at step S141.

As a result of the process in this step S141, the Y coordinate of the point F1 at the left and top corner portion in the rectangular effective image data area F surrounding the image G moves upward to the coordinate value 1750 (=2000−250) on the image data indicated by F0. If such a process is not executed, as will be described later in detail, an image is displayed at a portion close to the top end of the display screen 31 of the liquid crystal panel 30a and display data does not exist at the lower side of the display screen 31 (displayed is a portion deviated to the bottom outside of the image data stored in the RAM 24 in which image data does not exist) when an image to be displayed is positioned at a portion close to the bottom end of the entire image data. On the other hand, when the above process is executed, an image is displayed on a portion close to the upper end of the display screen 31 and displayed at the lower side of the display screen 31 is not a black dot but display data, bringing about an effect of effective display of the display data.

On the other hand, when Y=Ys>"total number of lines"−250 is not satisfied, it is judged as NO at step S140. This means that Y=Ys is positioned at the 250th line from the bottom end of all the lines of the image data or above the same. In this case, consequently, the CPU 22 keeps the setting of Y at step S118, i.e., maintains Y=Ys.

Figure 6:
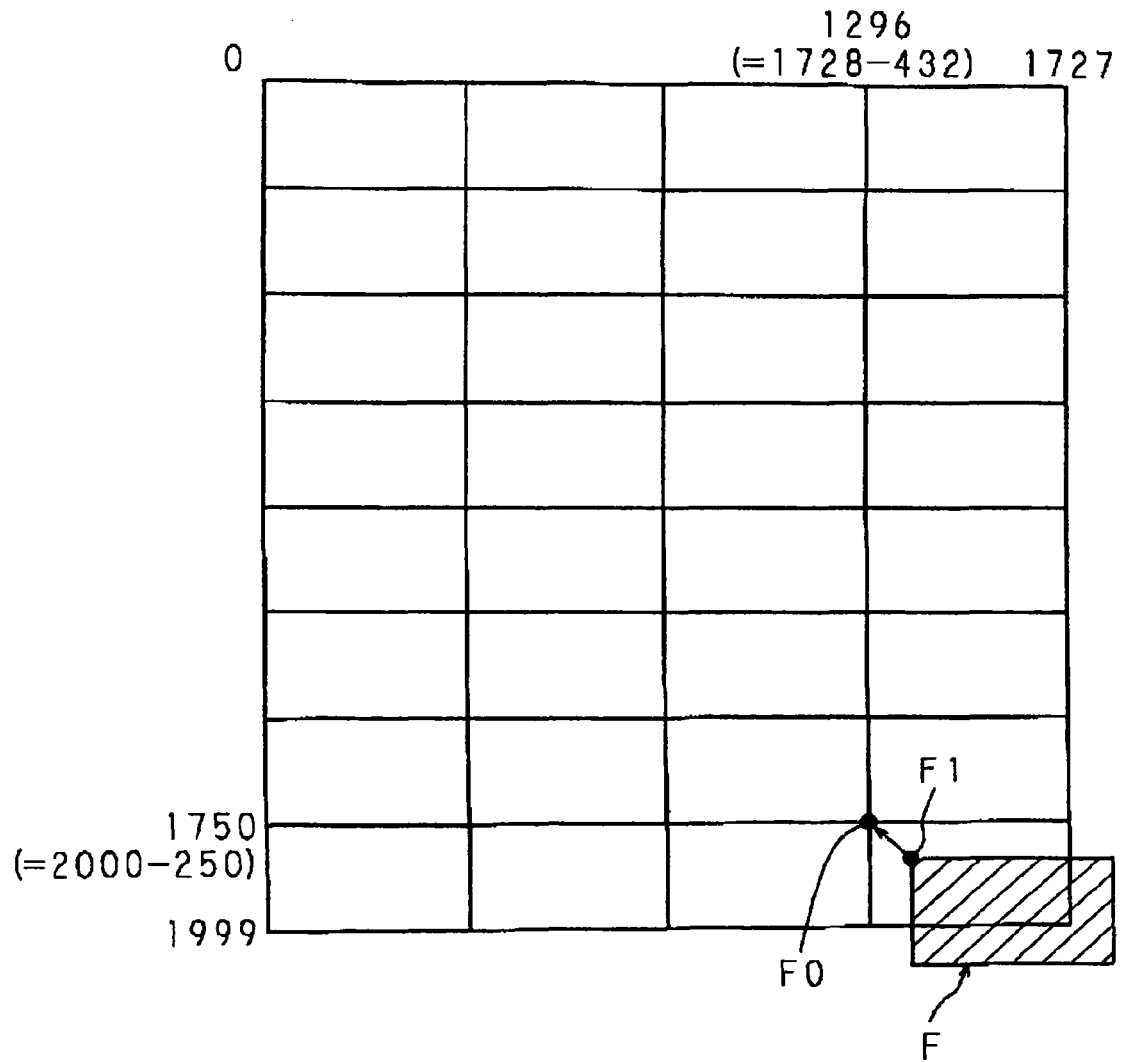
FIG. 6, FIG. 7 and FIG. 8 are schematic views of moving data area to be displayed.

Here, it should be assumed, as shown in FIG. 6, that the coordinate value of the F1 point is finally set to the coordinate value of the F0 point, that is, X=1296 (=1728−432) and Y=1750 (="total number of lines"−250) as a result of the process from step S130 to step S141 as described above. It should be noted that the process of step S130 through step S141 corresponds to functional blocks of the effective image data area moving unit 227.

In this case, in a display data forming process at step S142 to be executed next, the CPU 22 reads out data of an area (rectangular data area shown at the right and bottom portion in FIG. 6) corresponding to "width"×"height"="432 dots"× "250 lines" having X, Y (=196, 1750), which have been finally set as described above, of the image data stored in the RAM 24 at the left and top corner portion and forms image data which is fitted to the size of the display screen 31 of the liquid crystal panel 30a, or enlarged in particular.

Next, the CPU 22 executes a display process of the display data at step S190. Ix particular, the display data formed as described above is outputted to the display screen 31 after once stored in the VRAM within the display unit 30. As a result, the display unit 30 displays the image after adjusting the size of the image in the effective image data area F shown in FIG. 5 so as to be fitted to the size of the display screen 31 of the liquid crystal panel 30a based on the display data stored in the VRAM. It should be noted that the image in the effective image data area F is displayed here in a size enlarged four times (=1728/432=1000/250) as shown in FIG. 1.

As described above, since the display data for displaying an image in the effective image data area F shown in FIG. 5 is displayed with the left and top corner portion thereof being displayed at the left and top end position of the display screen 31 of the liquid crystal panel 30a, it is possible to reliably recognize that the received image data is not null data. As a result, there is no fear of being misled into thinking that receiving has failed even though image data has been received.

When a size of "width"×"height"="864 dots"×"500 lines" is selected as the size of the display data, in other words, the size of the effective image data area, the CPU 22 advances the process from step S120 to step S160.

At step S160, the CPU 22 judges whether X>1728−864 is satisfied or not. In particular, since X=Xs, judged is whether X=Xs>1728−864 is satisfied or not.

Here, when X=Xs>1728−864 is satisfied, the judgment result at step S160 becomes YES. This means that X=Xs is positioned on the right side of the 864th dot from the right end of one line. In this case, consequently, the CPU 22 sets X=864 (=1728−864) at step S161.

As a result of the process in this step S161, the X coordinate of the point F1 at the left and top corner portion in the rectangular effective image data area F surrounding the image G moves leftward to the coordinate value 864 (=1728−864) on the image data indicated by F0. If such a process is not executed, as will be described later in detail, an image is displayed at a portion close to the left end of the display screen 31 of the liquid crystal panel 30a and display data does not exist at the right side of the display screen 31 (displayed is a portion deviated to the right outside of the image data stored in the RAM 24 in which image data does not exist) when an image to be displayed is positioned at a portion close to the right end of the entire image data. On the other hand, when the above process is executed, an image is displayed on a portion close to the left end of the display screen 31 and displayed at the right side of the display screen 31 is not a black dot but display data, bringing about an effect of effective display of the display data.

On the other hand, when X=Xs>1728−864 is not satisfied, it is judged as NO at step S160. This means that X=Xs is positioned at the 864th dot from the right end of one line or on the left side thereof In this case, consequently, the CPU 22 keeps the setting of X at step S118, i.e., maintains X=Xs.

Next, at step S170, the CPU 22 judges whether Y>"total number of lines"−500 is satisfied or not. In particular, since Y=Ys, judged is whether Y=Ys>"total number of lines"−500 is satisfied or not. It should be noted that the total number of lines corresponds to the total number of lines 2000 of the image data read out from the RAM 24.

Here, when Y=Ys>"total number of lines"−500 is satisfied, the judgment result at step S170 becomes YES. This means that Y=Ys is positioned below the 500th line from the bottom end of all the lines of the image data, In this case, consequently, the CPU 22 sets Y=1500 (="total number of lines"−500) at step S171.

As a result of the process in this step S171, the Y coordinate of the point F1 at the left and top corner portion in the rectangular effective image data area F surrounding the image G moves upward to the coordinate value 1500 (=2000−500) on the image data indicated by F0. If such a process is not executed, as will be described later in detail, an image is displayed at a portion close to the top end of the display screen 31 of the liquid crystal panel 30a and display data does not exist at the lower side of the display screen 31 (displayed is a portion deviated to the bottom outside of the image data stored in the RAM 24 in which image data does not exist) when an image to be displayed is positioned at a portion close to the bottom end of the entire image data. On the other hand, when the above process is executed, an image is displayed on a portion close to the top end of the display screen 31 and displayed at the lower side of the display screen 31 is not a black dot but display data, bringing about an effect of effective display of the display data.

On the other hand, when Y=Ys>"total number of lines"−500 is not satisfied, it is judged as NO at sip S170. This means that Y=Ys is positioned at the 500th line from the bottom end of all the lines of the image data or above the same. In this case, consequently, the CPU 22 keeps the setting of Y at step S118, i.e., maintains Y=Ys.

Figure 7:
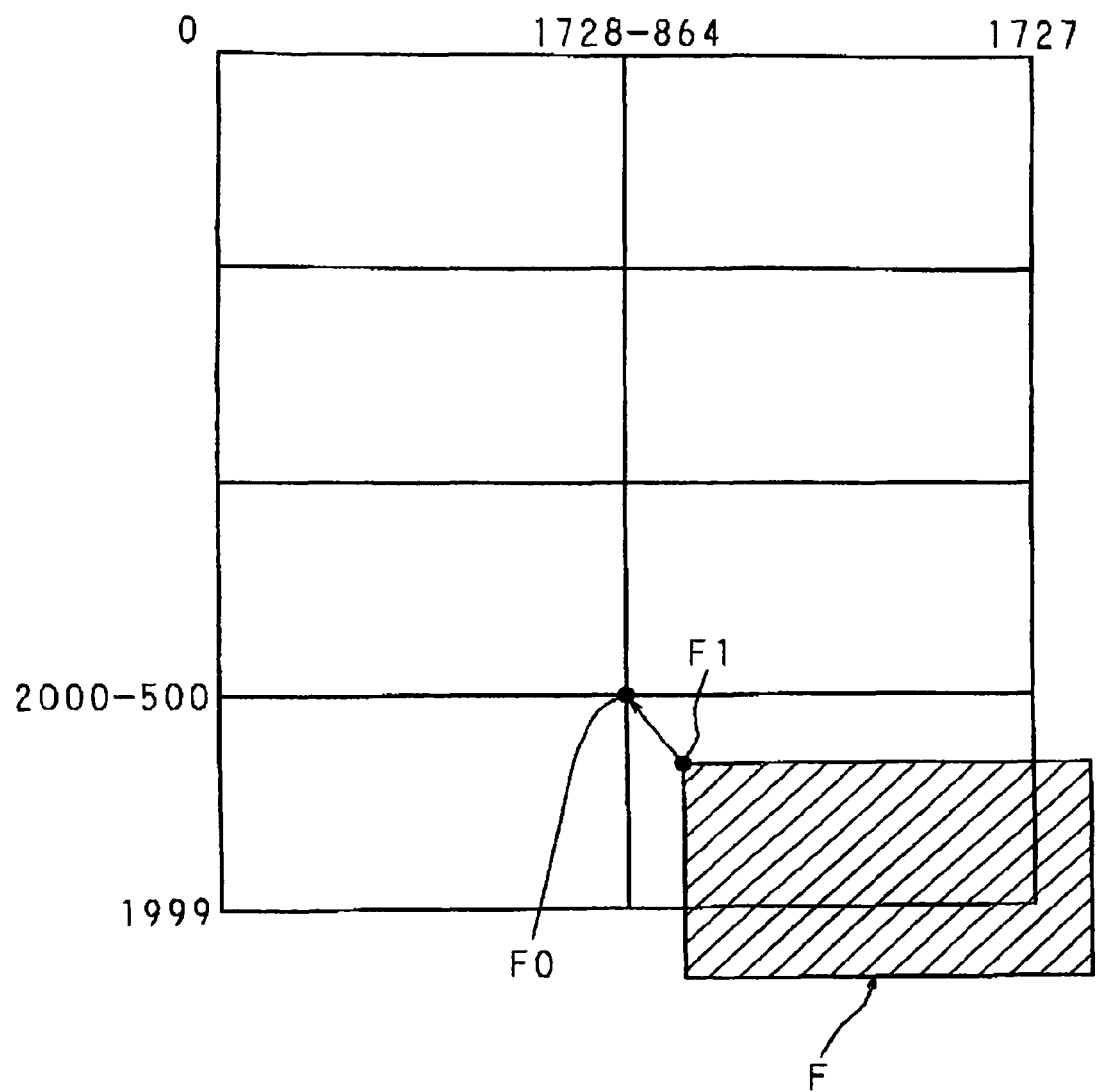

Here, it should be assumed, as shown in FIG. 7, that the coordinate value of the F1 point is finally set to the coordinate value of the F0 point, that is, X=864 (=1728−864) and Y=1500 (="total number of lines"−500) as a result of the process from step S160 to step S171 as described above. It should be noted that the process of step S160 through step S171 corresponds to functional blocks of the effective image data area moving unit 227.

In this case, in the display data forming process at step S172 to be executed next, the CPU 22 reads out data of an area (rectangular data area shown at the right and bottom portion in FIG. 7) corresponding to "width"×"height"="864 dots,"× "500 lines" having X, Y (=864, 1500), which have been finally set as described above, of the image data stored in the RAM 24 at the left and top corner portion and forms image data which is fitted to the size of the display screen 31 of the liquid crystal panel 30a, or enlarged in particular.

Next, the CPU 22 executes the display process of the display data at step S90. In particular, the display data formed as described above is outputted to the display screen 31 after once stored in the VRAM within the display unit 30. As a result, the display unit 30 displays the image after adjusting, or enlarging twice (=1728/862=1000/500) in particular, the size of the image in the effective image data area F shown in FIG. 7 so as to be fitted to the size of the display screen 31 of the liquid crystal panel 30a based on the display data stored in the VRAM.

As described above, since the display data for displaying an image in the effective image data area F shown in FIG. 5 is displayed with the left and top corner portion thereof being displayed at the left and top end position of the display screen 31 of the liquid crystal panel 30a, it is possible to reliably recognize that the received image data is not null data. As a result, there is no fear of being misled into thinking that receiving has failed even though image data has been received.

When a size of "width"×"height"="1728 dots"×"1000 lines" is selected as the size of the display data, in other words, the size of the effective image data area, the CPU 22 advances the process from step S120 to step S180*a*.

At step S180*a*, the CPU 22 sets X=0.

As a result of the process in this step S180*a*, the X coordinate of the point F1 at the left and top corner portion in the rectangular effective image data area F surrounding the image G moves leftward to the coordinate value 0 on the image data indicated by F0. If such a process is not executed, as will be described later in detail, an image is displayed at a portion dose to the right end of the display screen 31 of the liquid crystal panel 30*a* and display data does not exist at the right side of the display screen 31 (displayed is a portion deviated to the right outside of the image data stored in the RAM 24 in which image data does not exist) when an image to be displayed is positioned at a portion dose to the right end of the entire image data. On the other hand, when the above process is executed, an image is displayed on a portion close to the left end of the display screen 31 and displayed at the right side of the display screen 31 is not a black dot but display data, bringing about an effect of effective display of the display data.

Next, at step S180, the CPU 22 judges whether Y>"total number of lines"−1000 is satisfied or not. In particular, since Y=YS, judged is whether Y=Ys >"total number of lines"−1000 is satisfied or not.

Here, when Y=Ys >"total number of lines"−1000 is satisfied, the judgment result at step S180 becomes YES. This means that Y=Ys is positioned below the 1000th line from the bottom end of all the lines of the image data. In this case, consequently, the CPU 22 sets Y=1000 (="total number of lines"−1000) at step S181.

As a result of the process in this step S181, the Y coordinate of the point F1 in the rectangular effective image data area F surrounding the image G moves upward to the coordinate value 1000 (=2000−1000) on the image data indicated by F0. If such a process is not executed, as will be described later in detail, an image is displayed at a portion close to the top end of the display screen 31 of the liquid crystal panel 30*a* and display data does not exist at the lower side of the display screen 31 (displayed is a portion deviated to the bottom outside of the image data stored in the RAM 24 in which image data does not exist) when an image to be displayed is positioned at a portion close to the bottom end of the entire image data. On the other hand, when the above process is executed, an image is displayed on a portion close to the top end of the display screen 31 and displayed at the lower side of the display screen 31 is not a black dot but display data, bringing about an effect of effective display of the display data.

On the other hand, when Y=Ys>"total number of lines"−1000 is not satisfied, it is judged as NO at step S180. This means that Y=Ys is positioned at the 1000th line from the bottom end of all the lines of the image data or above the same. In this case, consequently, the CPU 22 keeps the setting of Y at step S118, i.e., maintains Y=Ys.

Here, it should be assumed, as shown in FIG. 8, that the coordinate value of the F1 point is finally set to the coordinate value of the F0 point, that is, X=0 and Y=1000 (="total number of lines"−1000) as a result of the process from step S180*a* to step S181 as described above. It should be noted that the process of step S180*a* through step S181 corresponds to functional blocks of the effective image data area moving unit 227.

In this case, in the display data forming process at step S182 to be executed next, the CPU 22 reads out data of an area (rectangular data area shown at the lower half portion in FIG. 8) corresponding to "width"×"height"="1728 dots"×"1000 lines" having X, Y (=0, 1000), which have been finally set as described above, of the image data stored in the RAM 24 at the left and top corner portion and forms image data which is fitted to the size of the display screen 31 of the liquid crystal panel 30*a*, or at the same magnification in particular.

Next, the CPU 22 executes the display process of the display data at step S190. In particular, the display data formed as described above is outputted to the display screen 31 after once stored in the VRAM within the display unit 30. As a result, the display unit 30 displays the image at the same magnification (=1728/1728=1000/1000) in the effective image data area F shown in FIG. 8 so as to be fitted to the display screen 31 of the liquid crystal panel 30*a* based on the display data stored in the VRAM.

It should be noted that each process at steps 142, 172, 182 and 190 in the present embodiment corresponds to the display control unit 226.

As described above, since the display data for displaying an image in the effective image data area F shown in FIG. 5 is displayed with the left and top corner portion thereof being displayed at the left and top end position of the display screen 31 of the liquid crystal panel 30*a*, it is possible to reliably recognize that the received image data is not null data. As a result, there is no fear of being misled into thinking that receiving has failed even though image data has been received.

As explained above, with an image display apparatus according to the present invention, image data representing an image G is displayed on the display screen 31 starting from the left and top end position (in particular, from the left and top corner portion of the rectangular effective image data area F surrounding the image G) depending on selection of the size of the display data at step S120. Consequently, the image G is reliably visible with the image size which suits operator's taste and in such a state that the operator is kept from being misled into thinking that the data is null. Especially, when a facsimile apparatus according to the present invention provided with an image display apparatus according to the present invention is a facsimile apparatus which has a function for receiving and only displaying, the advantage described above that the image data representing the image G is reliably visible is useful for efficient use of above function.

It should be noted that it is more convenient when the facsimile apparatus is configured in such a manner that the operator can select the size of the display data at step S120 according to his/her taste by operating the push-button type control switches 11.

It should be noted that, when it is judged as YES at step S100 when the process procedure of the CPU 22 proceeds to step S100 as described above, displayed is an image having a size larger than the size of the display screen 31 of the liquid crystal panel 30*a* unlike with the image data representing the image G shown in FIG. 5. It should be noted that the process of step S100 corresponds to functional blocks of the judging unit 224.

In such a case, the display data is automatically reduced so as to fall just into the display screen 31 of the liquid crystal panel 30*a* in the reducing process of the display data at step S200. Subsequently, the display data reduced at step S200 is outputted at step S190. It should be noted that the process at step S200 in the present embodiment corresponds to the reduction control unit 225. Such an image reduction display technique itself is well known.

Consequently, the display unit 30 displays an image having the same size as the display screen 31 of the liquid crystal panel 30*a* based on the reduced display data outputted from the control unit Consequently, the image is reliably visible to the operator even when the size thereof is larger than the size of the display screen 31 of the liquid crystal panel 30a.

With such an image display apparatus according to the present invention, the position of one corner portion of an effective image data area in image data is decided in the process of displaying the image data and the image data is displayed on the display screen starting from the position of the one corner portion of the effective image data area which has been decided in such a manner. Consequently, even when the top data portion of image data to be displayed is null data (blank), the image data is displayed on the display screen starting from the first effective data in the subsequent portion. Consequently, it is possible to reliably recognize that received image data is not null data, with facsimile transmission according to the present invention configured with an image display apparatus according to the present invention. As a result, there is no fear of being misled into thinking that receiving has failed even though image data has been received.

It should be noted that the implementation of the present invention is not limited to the above embodiment and various modification including the following examples can be made.

(1) The above embodiment is configured to obtain the point F1 at the left and top end position as one corner portion of the effective image data area. However, it should be configured to obtain a point of any one of other three corner portions, and the point of the obtained corner portion may be displayed on the corresponding corner portion of the display screen 31 of the display unit 30.

(2) The size of the display data to be selected at step S120 is not limited to the size disclosed in the above embodiment but may be suitably changed according to need.

(3) Although an image display apparatus according to the present invention is incorporated into a facsimile apparatus in the example of the above embodiment, it should be understood that the image display apparatus can be applied to a copying machine having a liquid crystal panel, for example. It should be noted that a panel-shaped display device such as an EL panel may be employed in place of a liquid crystal panel.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims

The invention claimed is:

1. An image displaying method for displaying image data stored in an image memory to a rectangular display screen provided on a display unit, comprising:
a first obtaining step of obtaining a minimum or maximum black dot position in a first scanning direction in said image data stored in said image memory;
a second obtaining step of obtaining a minimum or maximum black dot position in a second scanning direction in said image data stored in said image memory;
a step of deciding a position of one corner portion of a rectangular effective image data area in said image data stored in said image memory from the minimum or maximum black dot positions in the first scanning direction and the second scanning direction; and
a step of controlling said display unit to display said rectangular effective image data area based on the position of said decided one corner portion in said image data stored in said image memory on said display screen of said display unit starting from said one corner portion,
wherein the first obtaining step includes a step of, for respective lines extending in the first scanning direction, judging whether a black dot exists in each line and a step of judging whether a position of the existing black dot is one of a minimum and maximum black dot position in the first scanning direction, and obtains the minimum or maximum black dot position in the first scanning direction based on a result of the judgment, and
the second obtaining step includes a step of judging whether the position of the existing black dot is one of a minimum and maximum black dot position in the second scanning direction, and obtains the minimum or maximum black dot position in the second scanning direction based on a result of the judgment.

2. The image displaying method as set forth in claim 1, further comprising the step of, when a part of the effective image data area based on the position of said decided one corner portion is located outside of said image data, moving the position of said decided one corner portion of said effective image data area so that the whole of said effective image data area locates within said image data.

3. The image displaying method as set forth in claim 1, further comprising the steps of:
judging whether a size of a display data in said image data to be displayed on said display screen of said display unit is larger than a size of a display area of said display screen of said display unit; and
displaying said display data in a reduced manner so that a size of said display data is matched with a size of said display screen of said display unit when a size of said display data is larger than a size of said display screen of said display unit.

4. The image displaying method as set forth in claim 1, further comprising the step of adjusting an image to be displayed on said display screen of said display unit so that said image does not become larger than said effective image data area.

5. The image displaying method as set forth in claim 1, further comprising the step of displaying said effective image data area with a left and top end position being matched with a left and top end position of said display screen of said display unit, when a left and top end position of said effective image data area is decided as the position of said one corner portion.

6. The image displaying method as set forth in claim 5, further comprising the steps of:
judging whether a size of a display data in said image data to be displayed on said display screen of said display unit is larger than a size of a display area of said display screen of said display unit; and
displaying said display data in a reduced manner so that a size of said display data is matched with a size of said display screen of said display unit when a size of said display data is larger than a size of said display screen of said display unit.

7. An image display apparatus comprising:
a display unit that has a rectangular display screen;
a storage unit that stores image data to be displayed on said display screen of said display unit;
a first effective data position deciding unit that obtains a minimum or maximum black dot position in a first scanning direction in said image data stored in said storage unit;

a second effective data position deciding unit that obtains a minimum or maximum black dot position in a second scanning direction in said image data stored in said storage unit;

an image position deciding unit that decides a position of one corner portion of a rectangular effective image data area in said image data stored in said storage unit from the positions obtained by said first and second effective data position deciding units; and a display control unit that controls said display unit to display said rectangular effective image data area based on the position of said one corner portion decided by said image position deciding unit in said image data stored in said storage unit on said display screen of said display unit starting from said one corner portion;

wherein the first effective data position deciding unit, for respective lines extending in the first scanning direction, judges whether a black dot exists in each line and judges whether a position of the existing black dot is one of a minimum and maximum black dot position in the first scanning direction, and obtains the minimum or maximum black dot position in the first scanning direction based on a result of the judgment, and the second effective data position deciding unit judges whether the position of the existing black dot is one of a minimum and maximum black dot position in the second scanning direction, and obtains the minimum or maximum black dot position in the second scanning direction based on a result of the judgment.

8. The image displaying apparatus as set forth in claim 7, further comprising an effective image data area moving unit that, when a part of the effective image data area based on the position of said one corner portion decided by said image position deciding unit is located outside of said image data, moves the position of said decided one corner portion of said effective image data area so as that the whole of said effective image data area locates within said image data.

9. The image display apparatus as set forth in claim 7, further comprising:
a judging unit that judges whether a size of a display data in said image data to be displayed on said display screen of said display unit is larger than a size of a display area of said display screen of said display unit; and
a reduction control unit that causes said display unit to display said display data in a reduced manner so that a size of said display data is matched with a size of said display screen of said display unit when said judging unit judges that a size of said display data is larger than a size of said display screen of said display unit.

10. The image display apparatus as set forth in claim 7, wherein said display control unit adjusts an image to be displayed on said display screen of said display unit so that said image does not become larger than said effective image data area.

11. The image display apparatus as set forth in claim 7, wherein
said image position deciding unit decides the left and top end position of said effective image data area as the position of said one corner portion, and
said display control unit displays said effective image data area with a left and top end position decided by said image position deciding unit being matched with a left and top end position of said display screen of said display unit.

12. The image display apparatus as set forth in claim 11, further comprising:

a judging unit that judges whether a size of a display data in said image data to be displayed on said display screen of said display unit is larger than a size of a display area of said display screen of said display unit; and
a reduction control unit that causes said display unit to display said display data in a reduced manner so that a size of said display data is matched with a size of said display screen of said display unit when said judging unit judges that a size of said display data is larger than a size of said display screen of said display unit.

13. A facsimile apparatus comprising:
a display unit that has a rectangular display screen;
a storage unit that stores facsimile received image data to be displayed on said display screen of said display unit;
a first effective data position deciding unit that obtains a minimum or maximum black dot position in a first scanning direction in said facsimile received image data stored in said storage unit;
a second effective data position deciding unit that obtains a minimum or maximum black dot position in a second scanning direction in said facsimile received image data stored in said storage unit;
an image position deciding unit that decides a position of one corner portion of a rectangular effective image data area in said facsimile received image data stored in said storage unit from the positions obtained by said first and second effective data position deciding units; and
a display control unit that controls said display unit to display said rectangular effective image data area based on the position of said one corner portion decided by said image position deciding unit in said facsimile received image data stored in said storage unit on said display screen of said display unit starting from said one corner portion,
wherein the first effective data position deciding unit, for respective lines extending in the first scanning direction, judges whether a black dot exists in each line and judges whether a position of the existing black dot is one of a minimum and maximum black dot position in the first scanning direction, and obtains the minimum or maximum black dot position in the first scanning direction based on a result of the judgment, and
the second effective data position deciding unit judges whether the position of the existing black dot is one of a minimum and maximum black dot position in the second scanning direction, and obtains the minimum or maximum black dot position in the second scanning direction based on a result of the judgment.

14. The facsimile apparatus as set forth in claim 13, further comprising an effective image data area moving unit that, when a part of the effective image data area based on the position of said one corner portion decided by said image position deciding unit is located outside of said facsimile received image data, moves the position of said decided one corner portion of said effective image data area so as that the whole of said effective image data area locates within said facsimile received image data.

15. The facsimile apparatus as set forth in claim 13, further comprising:
a judging unit that judges whether a size of a display data in said facsimile received image data to be displayed on said display screen of said display unit is larger than a size of a display area of said display screen of said display unit; and
a reduction control unit that causes said display unit to display said display data in a reduced manner so that a size of said display data is matched with a size of said display screen of said display unit when said judging unit judges that a size of said display data is larger than a size of said display screen of said display unit.

16. The facsimile apparatus as set forth in claim 13, wherein said display control unit adjusts an image to be displayed on said display screen of said display unit so that said image does not become larger than said effective image data area.

17. The facsimile apparatus as set forth in claim 13, wherein
said image position deciding unit decides the left and top end position of said effective image data area as the position of said one corner portion, and
said display control unit displays said effective image data area with a left and top end position decided by said image position deciding unit being matched with a left and top end position of said display screen of said display unit.

18. The facsimile apparatus as set forth in claim 17, further comprising:
a judging unit that judges whether a size of a display data in said facsimile received image data to be displayed on said display screen of said display unit is larger than a size of a display area of said display screen of said display unit; and
a reduction control unit that causes said display unit to display said display data in a reduced manner so that a size of said display data is matched with a size of said display screen of said display unit when said judging unit judges that a size of said display data is larger than a size of said display screen of said display unit.

19. An image display apparatus comprising:
a display unit that has a rectangular display screen;
a storage unit that stores image data to be displayed on said display screen of said display unit;
a processor configured to execute software instruction units including:
a first effective data position deciding unit that obtains a minimum or maximum black dot position in a first scanning direction in said image data stored in said storage unit;
a second effective data position deciding unit that obtains a minimum or maximum black dot position in a second scanning direction in said image data stored in said storage unit;
an image position deciding unit that decides a position of one corner portion of a rectangular effective image data area in said image data stored in said storage unit from the positions obtained by said first and second effective data position deciding units; and
a display control unit that controls said display unit to display said rectangular effective image data area based on the position of said one corner portion decided by said image position deciding unit in said image data stored in said storage unit on said display screen of said display unit starting from said one corner portion;
wherein the first effective data position deciding unit, for respective lines extending in the first scanning direction, judges whether a black dot exists in each line and judges whether a position of the existing black dot is one of a minimum and maximum black dot position in the first scanning direction, and obtains the minimum or maximum black dot position in the first scanning direction based on a result of the judgment, and
wherein the second effective data position deciding unit judges whether the position of the existing black dot is one of a minimum and maximum black dot position in the second scanning direction, and obtains the minimum or maximum black dot position in the second scanning direction based on a result of the judgment.

20. The image displaying apparatus as set forth in claim 19, wherein the software instruction units further comprise:
an effective image data area moving unit that, when a part of the effective image data area based on the position of said one corner portion decided by said image position deciding unit is located outside of said image data, moves the position of said decided one corner portion of said effective image data area so as that the whole of said effective image data area locates within said image data.

21. The image display apparatus as set forth in claim 19, wherein the software instruction units further comprise:
a judging unit that judges whether a size of a display data in said image data to be displayed on said display screen of said display unit is larger than a size of a display area of said display screen of said display unit; and
a reduction control unit that causes said display unit to display said display data in a reduced manner so that a size of said display data is matched with a size of said display screen of said display unit when said judging unit judges that a size of said display data is larger than a size of said display screen of said display unit.

22. The image display apparatus as set forth in claim 19, wherein said display control unit adjusts an image to be displayed on said display screen of said display unit so that said image does not become larger than said effective image data area.

23. The image display apparatus as set forth in claim 19, wherein said image position deciding unit decides the left and top end position of said effective image data area as the position of said one corner portion, and
wherein said display control unit displays said effective image data area with a left and top end position decided by said image position deciding unit being matched with a left and top end position of said display screen of said display unit.

24. The image display apparatus as set forth in claim 23, wherein the software instruction units further comprise:
a judging unit that judges whether a size of a display data in said image data to be displayed on said display screen of said display unit is larger than a size of a display area of said display screen of said display unit; and
a reduction control unit that causes said display unit to display said display data in a reduced manner so that a size of said display data is matched with a size of said display screen of said display unit when said judging unit judges that a size of said display data is larger than a size of said display screen of said display unit.

* * * * *